(12) United States Patent
Ishikawa et al.

(10) Patent No.: US 7,147,970 B2
(45) Date of Patent: Dec. 12, 2006

(54) ELECTRODE MATERIAL FOR NON-AQUEOUS SOLVENT SECONDARY CELL, ELECTRODE AND SECONDARY CELL

(75) Inventors: Minoru Ishikawa, Fukushima-ken (JP); Kazuhiko Shimizu, Fukushima-ken (JP); Takashi Wakahoi, Fukushima-ken (JP); Shuji Morinishi, Fukushima-ken (JP); Naohiro Sonobe, Fukushima-ken (JP); Akio Hoshi, Fukushima-ken (JP)

(73) Assignee: Kureha Corporation, Tokyo (JP)

( * ) Notice: Subject to any disclaimer, the term of this patent is extended or adjusted under 35 U.S.C. 154(b) by 231 days.

(21) Appl. No.: 10/258,169

(22) PCT Filed: Feb. 20, 2002

(86) PCT No.: PCT/JP02/01461

§ 371 (c)(1),
(2), (4) Date: Oct. 22, 2002

(87) PCT Pub. No.: WO02/067348

PCT Pub. Date: Aug. 29, 2002

(65) Prior Publication Data

US 2003/0118908 A1    Jun. 26, 2003

(30) Foreign Application Priority Data

Feb. 22, 2001 (JP) .............................. 2001-047062

(51) Int. Cl.
    *H01M 4/48* (2006.01)
(52) U.S. Cl. .............................. 429/231.8; 429/231.4; 429/218.1; 429/220; 429/221; 429/223; 429/232; 252/182.1

(58) Field of Classification Search ............. 429/231.8, 429/231.4, 232, 218.1, 220, 221, 223; 252/182.1
See application file for complete search history.

(56) References Cited

U.S. PATENT DOCUMENTS 6,030,726 A    2/2000    Takeuchi et al. ......... 429/231.8

FOREIGN PATENT DOCUMENTS

| CN | 1186353 A | 7/1998 |
|----|-----------|--------|
| JP | 10-308207 | 11/1998 |
| JP | 11-054155 | 2/1999 |
| JP | 2000-090926 | * 3/2000 |

* cited by examiner

*Primary Examiner*—Laura Weiner
(74) *Attorney, Agent, or Firm*—Wenderoth, Lind & Ponack, L.L.P.

(57) ABSTRACT

An electrode material comprising a powdery mixture of a metal material (particularly, an intermetallic compound) and a capacitive carbon material each capable of doping and dedoping lithium, and an optionally added fine electroconductive additive, and containing the metal material and the capacitive carbon material in amounts of 5–60 wt. % and 40–95 wt. %, respectively, is used as an active substance for an electrode, particularly a negative electrode, of a non-aqueous solvent secondary cell. As a result, there is provided a non-aqueous solvent secondary cell which has large charge-discharge capacities, a small irreversible capacity determined as a difference between the doping capacity and the de-doping capacity, and also excellent cycle characteristics.

12 Claims, No Drawings

ELECTRODE MATERIAL FOR NON-AQUEOUS SOLVENT SECONDARY CELL, ELECTRODE AND SECONDARY CELL

TECHNICAL FIELD

The present invention relates to a non-aqueous solvent secondary cell electrode; particularly an electrode material (composition) forming a negative electrode having a large doping capacity per volume and suitable for providing a non-aqueous solvent secondary cell (or battery) having a high energy density.

BACKGROUND ART

As a type of high-energy density secondary cell, there has been proposed a non-aqueous solvent-type lithium secondary cell using a carbonaceous material for the negative electrode (e.g., Japanese Laid-Open Patent Appln. (JP-A) 57-208079, JP-A 62-90863, JP-A 62-122066 and JP-A 02-66856). The cell utilizes a phenomenon that a carbon intercalation compound of lithium can be easily formed electrochemically, and when the cell is charged, lithium in the positive electrode comprising, e.g., a chalcogenide compound, such as $LiCoO_2$, is electrochemically inserted between carbon layers in the negative electrode (doping). The carbon thus doped with lithium functions as a lithium electrode to cause a discharge, whereby the lithium is liberated (de-doped) from the carbon layers to return to the positive electrode.

For a carbonaceous material as such a negative electrode material, or also for a carbonaceous material as a positive electrode material doped with lithium source, an amount of electricity utilizable per unit weight is determined by a lithium-dedoping capacity, so that such an electrode-forming carbonaceous material should desirably have a large lithium-dedoping capacity.

In recent years, along with development of various portable appliances, there has been an increasing demand for a secondary cell of a higher energy density as a power supply for such appliances. For this reason, it has been proposed to use as an active substance of negative electrode various intermetallic compounds having a larger capacity per volume than a carbonaceous material which is doped with lithium in the form of atoms, because such intermetallic compounds can be doped with lithium in the form of ions having a much smaller size than the atoms at least at a higher rate than a carbonaceous material (e.g., JP-A 11-86853).

However, a non-aqueous solvent secondary cell using such an intermetallic compound as a negative electrode material suffers from a problem of wasting lithium in the positive electrode because of a large irreversible capacity (non-dedoping capacity) expressed as a difference between the doping capacity and the dedoping capacity of lithium in the intermetallic compound, and also a problem of an inferior secondary cell cycle characteristic (repetitive charge-discharge performance) due to crystal structure destruction and fine powder formation of the inter-metallic compound caused by repetitive expansion and contraction accompanying the repetition of doping-dedoping cycles in the inter-metallic compound.

DISCLOSURE OF INVENTION

In order to solve the above-mentioned problems, the present invention aims at providing a complex electrode material functioning as an active substance, which has a large charge-discharge capacity and a small irreversible capacity determined as a difference between the doping capacity and the dedoping capacity and can provide a non-aqueous solvent secondary cell having excellent cycle characteristics, and also an electrode and a secondary cell obtained therefrom.

As a result of our study for achieving the above objects, the above-mentioned problems of increase in irreversible capacity and deterioration of cycle characteristic encountered with the use of a high volume-basis capacity Li-doping metal material inclusive of the above-mentioned inter-metallic compound can be remarkably improved by the co-presence of a capacitive carbon material which per se has abilities of doping and dedoping lithium (Li). In this instance, it is understood that the capacitive carbon material is present between metal material particles in a state of good electrical contact therewith and functions as a sort of lubricant for absorbing stresses of expansion and contraction of metal material particles occurring at the time of doping and dedoping of lithium during the charging and discharging steps.

Thus, the electrode material for a non-aqueous solvent secondary cell according to the present invention is characterized by comprising a powdery mixture of a metal material and a capacitive carbon material each capable of doping and dedoping lithium, and an optional fine electroconductive additive, and containing 5–60 wt. % of the metal material and 40–95 wt. % of the capacitive carbon material.

The present invention further provides an electrode formed of the above-mentioned electrode material together with a binder, and also a non-aqueous solvent secondary cell including the electrode as at least one of the positive electrode and the negative electrode, preferably as the negative electrode.

BEST MODE FOR PRACTICING THE INVENTION

A first component of the electrode material of the present invention functioning as an electrode active substance of a non-aqueous solvent secondary cell is a (powdery) metal material capable of doping and dedoping lithium (Li), which may comprise a simple substance of elements (A-group elements), such as Ag, B, Al, Ga, In, Tl, Si, Ge, Sn, Pb, Sb, Bi and Te, capable of alloying with Li, or an inter-metallic compound comprising at least one A-group element, and a metal selected from elements (B-group elements), such as Cu, Mg, Mo, Fe, Ni and Co. Among these, it is preferred to use an inter-metallic compound of Sn with a metal selected from the group consisting of Cu, Mg, Mo, Fe and Ni, more preferably from the group consisting of Cu, Mg, and Fe, in order to provide an electrode material exhibiting good capacity per volume and cycle characteristic, and it is particularly preferred to use an inter-metallic compound comprising at least Cu and Sn. Such a Cu-Sn inter-metallic compound may be represented by a formula of $Cu_x Sn_y M_z$, wherein M represents an optionally contained one or more elements capable of forming an inter-metallic compound with Cu and Sn, and x, y and z are positive numbers representing atomic ratios among these elements. Examples of M may include the above-mentioned elements other than Cu and Sn, and further Li, Na, K, Ca, Ti, Zr, V, Nb, Ta, W, Mn, Rh, Ir and Zn. The atomic ratio x/y may preferably be in the range of 0.2–5, more preferably 0.4–4, particularly preferably 0.5–3.5. Too large x/y is not preferred because of a decrease in capacity. Too small x/y may provide large doping capacity and dedoping capacity at the initial stage, but tends to result in a lowering in capacity along with a repetition of charge-discharge, i.e., an inferior cycle characteristic. The above-mentioned preferred ranges for the x/y atomic ratio between Cu and Sn also hold true with the atomic ratio between the B-group element and the A-group element, other than Cu and Sn. The atomic ratio z/y defining the amount of the third element M should preferably be at most 1.0.

The above-mentioned metal material may preferably be used in a powdery state providing a volume-average particle size generally in a range of 0.05–100 μm, particularly 0.1–30 μm. If the volume-average particle size is too small, the metal material is liable to be affected by a chemical reaction, such as oxidation, due to an increase in surface area of the particles. Further, the surfaces are liable to provide active sites for hydrogen-withdrawal reaction, etc., so that the electrolytic solution is liable to be decomposed noticeably at the time of first charging. This is not desirable. Too large a volume-average particle size results in an increased electrode thickness leading to an increased internal resistance of the electrode and an increased Li-diffusion distance into the particles, which adversely affect the rate characteristic and the charge-discharge efficiency. This is also undesirable.

In the electrode material of the present invention, the metal material is used in an amount occupying 5–60 wt. %, preferably 5–50 wt. %, further preferably 5–40 wt. %. If the amount is too small, the effect of increasing the doping capacity and the dedoping capacity owing to the use of the metal material is scarce. On the other hand, if the amount is too large, it becomes difficult to attain the effects of lowering the irreversible capacity and improving the cycle characteristic owing to the incorporation of the capacitive carbon material.

A second component of the electrode material according to the present invention is a capacitive carbon material which per se has a capacity of doping and dedoping Li. It is generally preferred to use a carbonaceous material which exhibits a dedoping capacity of at least 300 mAh/g by itself as measured according to a method described hereinafter. Capacitive carbon materials Preferably used in the present invention may roughly include: (i) flaky graphite (natural graphite) characterized by an average layer plane spacing as measured by X-ray diffraction ($d_{002}$) of at most 0.345 nm, preferably at most 0.340 nm, further preferably at most 0.338 nm, and a specific surface area as measured by the BET method according to nitrogen adsorption ($S_{BET}$) of at least 1 $m^2/g$; (ii) granular graphite (artificial graphite) characterized by a $d_{002}$ value of at most 0.345 nm, preferably at most 0.340 rim, further preferably at most 0.338 nm, and an $S_{BET}$ value of below 1 $m^2/g$; and (iii) non-graphitic porous carbon material characterized by a $d_{002}$ value of at least 0.345 nm, preferably at least 0.365 nm, and an $S_{BET}$ value of at least 2.0 $m^2/g$. Any of the above-mentioned capacitive carbon materials exhibit the effect of improving the cycle characteristic when blended with the metal material, but other properties may be different.

More specifically, according to our study, in order for the electrode material of the present invention to persistently exhibit a good cycle characteristic, it is necessary to retain a good electroconductivity between the metal material and the capacitive carbon material. From this viewpoint, the flaky graphite (i) having a large outer surface area (as represented by an $S_{BET}$ value of at least 1 $m^2/g$, preferably at least 2 $m^2/g$, further preferably 3 $m^2/g$ or larger) and also an excellent ductility, is ideal and provides a good cycle characteristic. In contract thereto, the granular graphite (artificial graphite) (ii) has a large lithium-doping and -dedoping capacity by itself, but is liable to result in a lowering in electroconductivity with the metal material particles on repetition of charge-discharge when used alone, so that it is necessary to retain the electroconductivity between both particles at a good level by adding a fine electroconductive additive described later. However, such granular graphite used together with a fine electroconductive additive is isotropic and suitable for forming an electrode layer together with the metal material particles and a binder described later by coating, and is therefor a capacitive carbon material preferably used in the present invention also in view of its large lithium-doping and -dedoping capacity.

On the other hand, the non-graphitic carbonaceous materials (iii) have a substantially large lithium-doping and -dedoping capacity, but among these, e.g., a carbonaceous material originated from plants, such as coconut shell, has somewhat inferior conductivity, so that it is preferred to co-use a fine electroconductive additive together with such a carbonaceous material of plant origin. On the other hand, a pitch-based carbonaceous material exhibits a good electroconductivity by itself, so that it can be used without using a fine electroconductive additive in combination. An example of pitch-based non-graphitic porous carbonaceous material may be obtained through a process including steps of: mixing petroleum or coal pitch with an additive comprising an aromatic compound having two or three aromatic rings and a boiling point of at least 200° C. or a mixture thereof under heat-melting to form a shaped pitch product; extracting the additive from the shaped pitch product with a solvent showing a low dissolving power to the pitch and a high dissolving power to the additive; infusibilizing the resultant porous shaped pitch product by oxidization; and carbonizing the porous shaped pitch product at a temperature of 900–1500° C. under a reduced pressure of at most 10 KPa.

In the electrode material of the present invention, the capacitive carbon material is used in an amount of occupying at least 40 wt. %, more specifically in an amount selected from the range of 40–95 wt. %, so as to provide a total amount of 100 wt. % together with the above-mentioned metal material and the optionally added fine electroconductive additive described hereinafter.

As mentioned above, in case wherein (ii) granular graphite (artificial graphite) or (iii) a non-graphitic porous carbon material originated from plants, is used as a capacitive carbon material, it is extremely preferred to use a fine electroconductive additive in combination therewith to ensure a good electrical conductivity between the carbon material and the metal material. The fine electroconductive additive used for this purpose may comprise electroconductive carbon or metal in the form of powder or fiber. The fine electroconductive additive may preferably have an average particle size (or diameter) of at most 1 μm. Particularly preferred examples of the fine electroconductive additive may include carbon black, such as acetylene black or furnace black. Such a fine electroconductive additive inclusive of carbon black has only a small capacity of doping and dedoping lithium (e.g., 25 mAh/g or less) by itself, but contributes to the maintenance of a good cycle characteristic by ensuring an electrical continuity between the metal material and the carbon material. When used, the fine electroconductive additive may generally be used in an amount occupying 1 to 10 wt. % of the electrode material of the present invention. A larger amount is not preferred because it leads to a lower capacity of the resultant electrode.

The electrode material of the present invention may be obtained as a powdery mixture of the above-mentioned metal material, carbon material and optional fine electroconductive additive.

The secondary cell electrode of the present invention may be obtained, e.g., through a process wherein a binder is further added to the above-mentioned electrode material, or the components thereof inclusive of the metal material, carbon material and optional fine electroconductive additive, and an appropriate amount of appropriate solvent is added and mixed therewith to form a pasty electrode composition, which is then applied onto an electroconductive substrate comprising, e.g., a circular of rectangular metal sheet, dried thereon and press-molded to form a layer of, e.g., 10–200 µm in thickness. The binder may comprise, e.g., polyvinylidene fluoride, polytetrafluoroethylene or SBR, and is not particularly restricted as far as it is non-reactive with the electrolytic solution. The binder may preferably be used in an amount of 0.5 to 10 wt. parts per 100 wt. parts of the electrode material of the present invention. If the addition amount of the binder is excessive, the resultant electrode is caused to have a large electrical resistivity leading to a large internal resistance of the resultant cell and an undesirably lower cell performance. On the other hand, if the addition amount of the binder is too small, the bonding of the individual electrode material particles with each other and with the electroconductive substrate is liable to be insufficient.

The electrode material of the present invention can also be used as a positive electrode material for a non-aqueous solvent-type secondary cell by utilizing its good doping characteristic but may preferably be used as a negative electrode material of a non-aqueous solvent-type secondary cell, particularly for constituting a negative electrode to be doped with lithium as an active substance of a lithium secondary cell.

In the case of using the electrode material of the present invention for constituting a negative electrode of a non-aqueous solvent secondary cell, the other materials for constituting the cell, such as the positive electrode material, the separator and the electrolytic solution, are not particularly restricted, but various materials used or proposed hitherto for such a non-aqueous solvent secondary cell may be used.

For example, the positive electrode material may comprise a complex metal chalcogenide, particularly a complex metal oxide, such as $LiCoO_2$, $LiNiO_2$, $LiMnO_2$ or $LiMn_2O_4$. Such a positive electrode material may be formed alone or in combination with an appropriate binder into a layer on an electroconductive substrate.

The non-aqueous solvent-type electrolytic solution used in combination with the positive electrode and the negative electrode described above may generally be formed by dissolving an electrolyte in a non-aqueous solvent. The non-aqueous solvent may comprise one or two or more species of organic solvents, such as propylene carbonate, ethylene carbonate, dimethyl carbonate, diethyl carbonate, dimethoxyethane, diethoxyethane, gamma-butyrolactone, tetrahydrofuran, 2-methyl-tetrahydrofuran, sulfolane, and 1,3-dioxolane. Examples of the electrolyte may include $LiClO_4$, $LiPF_6$, $LiBF_4$, $LiCF_3SO_3$, $LiAsF_6$, LiCl, LiBr, $LiB(C_6H_5)_4$, and $LiN(SO_2CF_3)_2$.

A secondary cell may generally be formed by disposing the above-formed positive electrode and negative electrode opposite to each other, optionally with a liquid-permeable separator composed of, e.g., unwoven cloth or other porous materials, disposed therebetween, and dipping the positive and negative electrodes together with an intermediate permeable separator in an electrolytic solution as described above.

Incidentally, the values of $d_{002}$ and $S_{BET}$ (specific surface area) of the carbon material described herein are based values measured according to the following measurement methods. [Average layer spacing ($d_{002}$) of carbon material]

A powdery sample of a carbon material was packed in an aluminum-made sample cell and irradiated with monochromatic CuKα rays (wavelength λ=0.15418 nm) through a graphite monochromator to obtain an X-ray diffraction pattern. As for the correction of the diffraction pattern, no correction was effected with respect to the Lorentz polarization factor, absorption factor, atomic scattering factor, etc., but only the correction of double lines of $K\alpha_1$, and $K\alpha_2$ was effected according to the Rachinger's method. The peak position of the (002) diffraction line is determined by the center of gravity method (i.e., a method wherein the position of a gravity center of diffraction lines is obtained to determine a peak position as a 2θ value corresponding to the gravity center) and calibrated by the diffraction peak of (111) plane of high-purity silicon powder as the standard substance. The $d_{002}$ value is calculated from the Bragg's formula shown below.

$$d_{002}=\lambda/(2 \cdot \sin\theta) \quad \text{(Bragg's formula)}$$

[Specific surface area ($S_{BET}$) by nitrogen adsorption]

An approximate equation:

$$Vm=1/(V \cdot (1-x))$$

derived from the BET equation was used to obtain Vm (amount ($cm^3$/g-sample)) of adsorbed nitrogen required to form a mono-molecular layer of nitrogen on the sample surface) from a measured nitrogen volume V at a relative pressure x (=0.3) according to the BET single-point method using nitrogen adsorption. From the thus-obtained Vm-value, a specific surface area $S_{BET}$ was calculated based on the following equation:

$$S_{BET}=4.35 \times Vm (m^2/g).$$

More specifically, the nitrogen adsorption onto a carbonaceous material was performed at liquid nitrogen temperature by using "FLOW SORB II 2300" (available from Micromeritics Instrument Corp.) in the following manner.

A sample carbon material pulverized into an average diameter of 5–50 µm was packed in a sample tube, and the sample tube was cooled to −196° C. while flowing helium gas containing nitrogen at a concentration of 30 mol. %, thereby causing the carbonaceous material to adsorb nitrogen. Then, the sample tube was restored to room temperature to measure the amount of nitrogen desorbed from the sample by a thermal conductivity-type detector, thereby to obtain the adsorbed nitrogen amount V ($cm^3$/g-sample).

Hereinbelow, the present invention will be described more specifically with reference to Examples and Comparative Examples.

EXAMPLE 1

In a porcelain crucible, 2.11 g of copper powder (made by Wako Jun'yaku Kogyo K. K.) and 7.89 g of tin powder (made by Kanto Kagaku Kogyo K. K.) were placed so as to provide a Cu/Sn (atomic ratio)=1/2, and after mixing, subjected to an alloying treatment within a vertical tubular furnace of argon atmosphere. More specifically, the mixture was heated up to 665° C. at a rate of 400° C./h, held at that temperature for 2.5 hours and then cooled to obtain a metal material (an intermetallic compound). The thus-obtained intermetallic compound was pulverized by a rod mill (made by HEIKO K. K.) and sieved to obtain a powdery metal material comprising particles of 75 μm or smaller (an average particle size (Dav)=30 μm).

Then, 0.36 g of the powdery metal material and 1.44 g of flaky graphite powder (natural graphite produced in Brazil; Dav=40 μm, $S_{BET}$=3.5 m$^2$/g and $d_{002}$=0.336 nm) were blended in a metal/carbon ratio of 20/80 (by weight), to obtain an electrode material of the present invention.

Further, 1.8 g of the electrode material and 0.2 g of polyvinylidene fluoride (made by Kureha Chemical Industry, Co. Ltd.; showing an inherent viscosity (at 30° C.) of 1.1 dl/g when measured as a solution at a concentration of 4 g/liter in dimethylformamide) were mixed together with N-methyl-2-pyrrolidone to form a paste, which was uniformly applied on an aluminum foil, dried, peeled off the aluminum foil and stamped into a disk of 15 mm in diameter, thus obtaining a disk-shaped filmy electrode. The electrode exhibited a bulk density of 2.28 g/cm$^3$.

Some outlines, such as the compositions, of the above-obtained electrode material and electrode are inclusively shown in Table 1 appearing hereinafter together with those of Examples and Comparative Examples described below.

EXAMPLES 2 to 4

Metal materials (intermetallic compounds) were prepared in the same manner as in Example 1 except for changing the Cu/Sn atomic ratios as shown in Table 1, and electrode materials and disk-shaped filmy electrodes of the present invention were prepared therefrom otherwise in the same manner as in Example 1.

EXAMPLE 5

A powdery metal material of Cu/Sn (atomic ratio)=3/1 of Example 4 was blended with an identical amount of flaky graphite powder to obtain an electrode material of the present invention, which was then used in the same manner as in Example 1 to obtain a disk-shaped filmy electrode.

EXAMPLE 6

A metal material (intermetallic compound) was obtained in the same manner as in Example 1 except for using Mg powder (made by Wako Jun'yaku Kogyo) and Sn powder so as to provide an Mg/Sn atomic ratio of 2/1, and the metal material was used otherwise in the same manner as in Example 1 to obtain an electrode material of the present invention and a disk-shaped filmy electrode.

EXAMPLE 7

A metal material (intermetallic compound) was obtained in the same manner as in Example 1 except for using Fe powder (made by Wako Jun'yaku Kogyo) and Sn powder so as to provide an Fe/Sn atomic ratio of 2/1, and the metal material was used otherwise in the same manner as in Example 1 to obtain an electrode material of the present invention and a disk-shaped filmy electrode.

EXAMPLE 8

Commercially available Al powder comprising particles of 25 μm or smaller (Dav=16 μm) was used as it was as a metal material and blended with flaky graphite powder otherwise in the same manner as in Example 1 to obtain an electrode material of the present invention, which was thereafter used in the same manner as in Example 1 to obtain a disk-shaped filmy electrode.

COMPARATIVE EXAMPLE 1

An electrode material composed of only the flaky graphite powder used in Example 1 and containing no metal material was used to prepare a disk-shaped filmy electrode otherwise in the same manner as in Example 1.

COMPARATIVE EXAMPLE 2

The metal material (intermetallic compound) of Cu/Sn=1/1 (atomic ratio) prepared in Example 2 and the flaky graphite powder used in Example 1 were blended in a weight ratio of 80:20 to obtain an electrode material, and the electrode material was used otherwise in the same manner as in Example 1 to prepare a disk-shaped filmy electrode.

COMPARATIVE EXAMPLE 3

The metal material (intermetallic compound) of Mg/Sn=2/1 (atomic ratio) prepared in Example 6 and the flaky graphite powder used in Example 1 were blended in a weight ratio of 70:30 to obtain an electrode material, and the electrode material was used otherwise in the same manner as in Example 1 to prepare a disk-shaped filmy electrode.

COMPARATIVE EXAMPLE 4

The metal material (intermetallic compound) of Fe/Sn=1/1 (atomic ratio) prepared in Example 7 and the flaky graphite powder used in Example 1 were blended in a weight ratio of 70:30 to obtain an electrode material, and the electrode material was used otherwise in the same manner as in Example 1 to prepare a disk-shaped filmy electrode.

COMPARATIVE EXAMPLE 5

A metal material of the Al powder used in Example 8 and the flaky graphite powder used in Example 1 were blended in a weight ratio of 70:30 to obtain an electrode material, and the electrode material was used otherwise in the same manner as in Example 1 to prepare a disk-shaped filmy electrode.

The outlines of the electrode (and materials) obtained in the above Examples and Comparative Examples are inclusively shown in Table 1 appearing hereinafter.

(Doping-dedoping test)

The electrodes obtained in Examples and Comparative Examples described above were respectively used to prepare a non-aqueous solvent-type secondary battery (cell) and the performances thereof were evaluated in the following manner.

The electrode material of the present invention is generally suited for constituting a negative electrode of a non-aqueous solvent secondary battery. However, in order to accurately evaluate the performances of an electrode material inclusive of a doping capacity and a de-doping capacity for a cell active substance and also an amount of the cell active substance remaining in the electrode material without being dedoped ("irreversible capacity" (A–B)) in a manner free from a fluctuation in performance of a counter electrode material, a large excess amount of lithium metal showing a stable performance was used as a negative electrode, and each electrode prepared above was used to constitute a positive electrode, thereby forming a lithium secondary battery, of which the performances were evaluated.

More specially, each of the 15 mm-dia. disk-shaped filmy electrodes was press-bonded onto a 17 mm-dia. stainless steel net disk spot-welded to an inner lid of a can for a coin-shaped cell of 2016 size (i.e., a diameter of 20 mm and a thickness of 1.6 mm) to form a positive electrode containing ca. 20 mg of electrode material.

The preparation of a negative electrode (lithium electrode) was performed in a glove box of Ar atmosphere. A 17 mm-dia stainless steel net disk was preliminarily spot-welded to an outer lid of the 2016-size coin-shaped cell can, and a 15 mm-dia. disk stamped from a 0.5 mm-thick lithium metal sheet was press-bonded onto the stainless steel net disk to provide a negative electrode.

A coin-shaped non-aqueous solvent lithium secondary cell of 2016 size was assembled in an Ar glove box by using the above-prepared positive and negative electrodes, and an electrolytic solution prepared by adding $LiPF_6$ in a mixture solvent of ethylene carbonate, dimethyl carbonate and ethyl methyl carbonate in volumetric ratios of 1:1:1 at a rate of 1 mol/liter, together with a separator of polypropylene-made micro-porous membrane and a polyethylene-made gasket.

In the lithium secondary cell thus composed, the electrode material was subjected to doping and dedoping of lithium to evaluate the capacities therefor. The doping was effected by charging the cell at a constant current density of 1.0 mA/cm$^2$ until the equilibrium potential between the terminals reached 0 volt, and then charging the cell at a constant voltage of 0 volt while gradually reducing the current down to 200 μA, when the doping was terminated. The electricity thus flowed was divided by the weight of the electrode material used to provide a doping capacity (A) in terms of mAh/g. Then, in a similar manner, a current was flowed in a reverse direction to dedope the lithium from the doped electrode material. The dedoping was effected by discharging the cell at a constant current density of 1.0 mA/cm$^2$ until the equilibrium potential between the terminals reached 1.5 volts, when the de-dedoping was terminated. The electricity thus flowed was divided by the weight of the electrode material to provide a dedoping capacity (B) in terms of mAh/g. The dedoping capacity (B) was divided by the doping capacity (A) and multiplied by 100 to provide a discharge efficiency (%). This is a measure of effective utilization of the active substance. The dedoping capacity (B) was multiplied by the electrode bulk density (unit:mg/cm$^3$) to provide dedoping volumetric capacity (unit:mAh/cm$^3$). Further, the discharge capacity (dedoping capacity) at a 10th-cycle discharge was divided by the first-cycle discharge and multiplied by 100 to provide a discharge capacity retentivity (%). Further, a dedoping volumetric capacity in the 10-th cycle discharge (unit: mAh/cm$^3$) was also obtained.

The cell performances of the lithium secondary cells obtained by using the electrodes of the above Examples and Comparative Examples in the above-described manner are inclusively shown in Table 2.

TABLE 1

Outlines of electrodes (materials)

| | Electrode material | | | | | | | Electrode | |
|---|---|---|---|---|---|---|---|---|---|
| | Metal material | | Conductor | Carbon material | | | | Binder | Bulk |
| Example | Composition (atomic ratio) | Content (wt. %) | content (wt. %) | Property | $S_{BET}$ (m$^2$/g) | $d_{002}$ (nm) | Content (wt. %) | content (wt. %) | density (g/cm$^3$) |
| 1 | Cu:Sn = 1:2 | 20 | 0 | flaky graphite | 3.5 | 0.336 | 80 | 10 | 2.28 |
| 2 | Cu:Sn = 1:1 | 20 | 0 | flaky graphite | 3.5 | 0.336 | 80 | 10 | 2.33 |
| 3 | Cu:Sn = 2:1 | 20 | 0 | flaky graphite | 3.5 | 0.336 | 80 | 10 | 2.30 |
| 4 | Cu:Sn = 3:1 | 20 | 0 | flaky graphite | 3.5 | 0.336 | 80 | 10 | 2.29 |
| 5 | Cu:Sn = 3:1 | 50 | 0 | flaky graphite | 3.5 | 0.336 | 50 | 10 | 2.62 |
| 6 | Mg:Sn = 2:1 | 20 | 0 | flaky graphite | 3.5 | 0.336 | 80 | 10 | 1.92 |
| 7 | Fe:Sn = 1:1 | 20 | 0 | flaky graphite | 3.5 | 0.336 | 80 | 10 | 2.02 |
| 8 | Al alone (≦25 μm) | 20 | 0 | flaky graphite | 3.5 | 0.336 | 80 | 10 | 1.99 |
| Comp. 1 | None | 0 | 0 | flaky graphite | 3.5 | 0.336 | 100 | 10 | 1.82 |
| Comp. 2 | Cu:Sn = 1:1 | 80 | 0 | flaky graphite | 3.5 | 0.336 | 20 | 10 | 3.62 |
| Comp. 3 | Mg:Sn = 2:1 | 70 | 0 | flaky graphite | 3.5 | 0.336 | 30 | 10 | 2.06 |
| Comp. 4 | Fe:Sn = 1:1 | 70 | 0 | flaky graphite | 3.5 | 0.336 | 30 | 10 | 3.41 |
| Comp. 5 | Al alone (≦25 μm) | 70 | 0 | flaky graphite | 3.5 | 0.336 | 30 | 10 | 2.23 |

TABLE 2

Charge-discharge performances

| | | | 1st. cycle charge-discharge | | | | | 10th-cycle discharge | |
|---|---|---|---|---|---|---|---|---|---|
| | Electrode material | | Doping | Dedoping | Non-dedoping | Discharge | Dedoping volumetric | Discharge capacity | Dedoping volumetric |
| Example | Composition (atomic ratio) | Content (wt. %) | capacity (mAh/g) | capacity (mAh/g) | capacity (mAh/g) | efficiency (%) | capacity (mAh/cm$^3$) | retentivity (%) | capacity (mAh/cm$^3$) |
| 1 | Cu:Sn = 1:2 | 20 | 439 | 375 | 64 | 85.4 | 855 | 85.6 | 732 |
| 2 | Cu:Sn = 1:1 | 20 | 422 | 369 | 53 | 87.4 | 861 | 87.5 | 753 |

TABLE 2-continued

Charge-discharge performances

| | Electrode material | | 1st. cycle charge-discharge | | | | | 10th-cycle discharge | |
|---|---|---|---|---|---|---|---|---|---|
| Example | Composition (atomic ratio) | Content (wt. %) | Doping capacity (mAh/g) | Dedoping capacity (mAh/g) | Non-dedoping capacity (mAh/g) | Discharge efficiency (%) | Dedoping volumetric capacity (mAh/cm$^3$) | Discharge capacity retentivity (%) | Dedoping volumetric capacity (mAh/cm$^3$) |
| 3 | Cu:Sn = 2:1 | 20 | 384 | 338 | 46 | 88.0 | 774 | 91.4 | 707 |
| 4 | Cu:Sn = 3:1 | 20 | 356 | 319 | 37 | 89.6 | 731 | 96.6 | 706 |
| 5 | Cu:Sn = 3:1 | 50 | 303 | 263 | 40 | 86.8 | 689 | 70.7 | 487 |
| 6 | Mg:Sn = 2:1 | 20 | 431 | 389 | 42 | 90.2 | 747 | 74.6 | 557 |
| 7 | Fe:Sn = 1:1 | 20 | 419 | 365 | 54 | 87.2 | 737 | 88.2 | 650 |
| 8 | Al alone (≦25 μm) | 20 | 473 | 425 | 48 | 89.9 | 844 | 82.4 | 695 |
| Comp. 1 | None | 0 | 366 | 338 | 28 | 92.3 | 615 | 100 | 615 |
| Comp. 2 | Cu:Sn = 1:1 | 80 | 443 | 225 | 218 | 50.8 | 814 | 18.7 | 152 |
| Comp. 3 | Mg:Sn = 2:1 | 70 | 604 | 401 | 203 | 66.3 | 826 | 10.7 | 88 |
| Comp. 4 | Fe:Sn = 1:1 | 70 | 451 | 235 | 216 | 50.9 | 801 | 18.7 | 150 |
| Comp. 5 | Al alone (≦25 μm) | 70 | 849 | 662 | 187 | 78.0 | 1476 | 12.6 | 186 |

EXAMPLE 9

The metal material (intermetallic compound) of Cu/Sn=1/2 (atomic ratio) prepared in Example 1, granular graphite (artificial graphite) powder (obtained by calcining non-infusibilzed coke at 28000° C.; Dav=25 μm, $S_{BET}$=0.5 m$^2$/g, $d_{002}$=0.338 nm) and carbon black ("#4500", made by Tohkai Carbon K. K. ; Dav=ca. 0.04 μm) were blended in weight ratios of 20:75:5 to obtain an electrode material, which was used otherwise in the same manner as Example 1 to prepare a disk-shaped filmy electrode.

EXAMPLE 10

A disk-shaped filmy electrode was prepared in the same manner as in Example 9 (by using the same electrode material as in Example 9) except for changing the ratio of the electrode material and the binder from 90:10 (by weight) to 95:5 (by weight).

EXAMPLE 11

An electrode material was prepared and a disk-shaped filmy electrode was prepared therefrom respectively in the same manner as in Example 9 except for using the metal material (intermetallic compound) of Cu/Sn=3/1 (atomic ratio) prepared in Example 4 as the metal material.

EXAMPLE 12

An electrode material was prepared by blending the metal material (intermetallic compound) and the granular graphite (artificial graphite) and without adding the fine electroconductive additive (carbon black) thereto, and a disk-shaped filmy electrode was prepared by using the electrode material otherwise in the same manner as in Example 9.

EXAMPLE 13

An electrode material was prepared in the same manner as in Example 9 except for using Sn powder having particle sizes of 75 μm or smaller (Dav=35 μm) alone as the metal material, and a disk-shaped filmy electrode was prepared by using the electrode material otherwise in the same manner as in Example 9.

COMPARATIVE EXAMPLE 6

An electrode material was prepared in the same manner as in Example 9 except for blending the Sn powder, the granular graphite and the carbon black in weight ratios of 80:15:5, and a disk-shaped filmy electrode was prepared by using the electrode material otherwise in the same manner as in Example 9.

COMPARATIVE EXAMPLE 7

An electrode material was prepared by blending the granular graphite and the carbon black in a weight ratio of 95:5, and a disk-shaped filmy electrode was prepared by using the electrode material otherwise in the same manner as in Example 9.

COMPARATIVE EXAMPLE 8

An electrode material was prepared in the same manner as in Example 9 except for blending the metal material (intermetallic compound) of Cu/Sn=1/2 (atomic ratio), the granular graphite and the fine electroconductive additive (carbon black), respectively used in Example 9, in weight ratios of 80:15:5, and a disk-shaped filmy electrode was prepared by using the electrode material otherwise in the same manner as in Example 9.

The outlines of the electrodes (and materials) of the above-mentioned Examples 9–13 and Comparative Examples 6–8 are inclusively shown in Table 3 below.

(Doping-dedoping test)

Non-aqueous solvent secondary cells were prepared and the performances thereof were evaluated in the same manner as in Examples 1–8, etc., except for using the disk-shaped filmy electrodes prepared in the above Examples 9–13 and Comparative Examples 6–8. The results are shown in Table 4.

TABLE 3

Outlines of electrodes (materials)

| | Electrode material | | | | | | | Electrode | |
| --- | --- | --- | --- | --- | --- | --- | --- | --- | --- |
| | Metal material | | Conductor | Carbon material | | | | Binder | Bulk |
| Example | Composition (atomic ratio) | Content (wt. %) | content (wt. %) | Property | $S_{BET}$ ($m^2/g$) | $d_{002}$ (nm) | Content (wt. %) | content (wt. %) | density ($g/cm^3$) |
| 9 | Cu:Sn = 1:2 | 20 | 5 | granular graphite | 0.5 | 0.338 | 75 | 10 | 1.69 |
| 10 | Cu:Sn = 1:2 | 20 | 5 | granular graphite | 0.5 | 0.338 | 75 | 5 | 1.69 |
| 11 | Cu:Sn = 3:1 | 20 | 5 | granular graphite | 0.5 | 0.338 | 75 | 10 | 1.70 |
| 12 | Cu:Sn = 1:2 | 20 | 0 | granular graphite | 0.5 | 0.338 | 80 | 10 | 1.82 |
| 13 | Sn alone | 20 | 5 | granular graphite | 0.5 | 0.338 | 75 | 10 | 1.68 |
| Comp. 6 | Sn alone | 80 | 5 | granular graphite | 0.5 | 0.338 | 15 | 10 | 3.34 |
| Comp. 7 | None | 0 | 5 | granular graphite | 0.5 | 0.338 | 95 | 10 | 1.50 |
| Comp. 8 | Cu:Sn = 1:2 | 80 | 5 | granular graphite | 0.5 | 0.338 | 15 | 10 | 3.40 |

TABLE 4

Charge-discharge performances

| | | | | 1st. cycle charge-discharge | | | | | 10th-cycle discharge | |
| --- | --- | --- | --- | --- | --- | --- | --- | --- | --- | --- |
| | Electrode material | | Conductor | Doping | Dedoping | Non-dedoping | Discharge | Dedoping volumetric | Discharge capacity | Dedoping volumetric |
| Example | Composition (atomic ratio) | Content (wt. %) | content (wt. %) | capacity (mAh/g) | capacity (mAh/g) | capacity (mAh/g) | efficiency (%) | capacity (mAh/$cm^3$) | retentivity (%) | capacity (mAh/$cm^3$) |
| 9 | Cu:Sn = 1:2 | 20 | 5 | 453 | 365 | 88 | 80.6 | 617 | 84.4 | 521 |
| 10 | Cu:Sn = 1:2 | 20 | 5 | 383 | 326 | 57 | 85.1 | 551 | 85.0 | 468 |
| 11 | Cu:Sn = 3:1 | 20 | 5 | 364 | 308 | 56 | 84.6 | 524 | 87.7 | 460 |
| 12 | Cu:Sn = 1:2 | 20 | 0 | 378 | 306 | 72 | 81.0 | 557 | 73.2 | 408 |
| 13 | Sn alone | 20 | 5 | 468 | 370 | 98 | 79.1 | 622 | 80.3 | 499 |
| Comp. 6 | Sn alone | 80 | 5 | 795 | 508 | 287 | 63.9 | 1697 | 13.5 | 229 |
| Comp. 7 | None | 0 | 5 | 359 | 324 | 35 | 90.3 | 486 | 98.5 | 479 |
| Comp. 8 | Cu:Sn = 1:2 | 80 | 5 | 483 | 306 | 177 | 63.4 | 1040 | 17.3 | 180 |

EXAMPLE 14

An electrode material was prepared by blending the metal material (intermetallic compound) of Cu/Sn=3/1 (atomic ratio) prepared in Example 4 and a pitch-based non-graphitic porous carbon material ("CARBOTRON P", made by Kureha Chemical Industry, Co. Ltd.; Dav=25 μm, $S_{BET}$=5.9 $m^2/g$ and $d_{002}$=0.383 nm) in a weight ratio of 20:80, and a disk-shaped filmy electrode was prepared by using the electrode material otherwise in the same manner as in Example 1.

COMPARATIVE EXAMPLE 9

An electrode material was prepared by blending the metal material (intermetallic compound) of Cu/Sn=3/1 (atomic ratio) and the pitch-based non-graphitic porous carbon material respectively used in Example 14 in a weight ratio of 70:30, and a disk-shaped filmy electrode was prepared by using the electrode material otherwise in the same manner as in Example 14.

The outlines of the electrodes (and materials) of the above-mentioned Example 14 and Comparative Example 9 are inclusively shown in Table 5 below.

(Doping-dedoping test)

Non-aqueous solvent secondary cells were prepared and the performances thereof were evaluated in the same manner as in Examples 1–8, etc., except for using the disk-shaped filmy electrodes prepared in the above Example 14 and Comparative Example 9. The results are shown in Table 6.

TABLE 5

Outlines of electrodes (materials)

| | Electrode material | | | | | | | Electrode | |
| --- | --- | --- | --- | --- | --- | --- | --- | --- | --- |
| | Metal material | | Conductor | Carbon material | | | | Binder | Bulk |
| Example | Composition (atomic ratio) | Content (wt. %) | content (wt.%) | Property | $S_{BET}$ ($m^2/g$) | $d_{002}$ (nm) | Content (wt. %) | content (wt. %) | density ($g/cm^3$) |
| 14 | Cu:Sn = 3:1 | 20 | 0 | non-graphitic | 5.9 | 0.383 | 80 | 10 | 1.90 |
| Comp. 9 | Cu:Sn = 3.1 | 70 | 0 | non-graphitic | 5.9 | 0.383 | 30 | 10 | 2.77 |

TABLE 6

| | Electrode material | | Charge-discharge performances | | | | | 10th-cycle discharge | |
|---|---|---|---|---|---|---|---|---|---|
| | | | 1st. cycle charge-discharge | | | | | | |
| | | | Doping | Dedoping | Non-dedoping | Discharge | Dedoping volumetric | Discharge capacity | Dedoping volumetric |
| Example | Composition (atomic ratio) | Content (wt. %) | capacity (mAh/g) | capacity (mAh/g) | capacity (mAh/g) | efficiency (%) | capacity (mAh/cm$^3$) | retentivity (%) | capacity (mAh/cm$^3$) |
| 14 | Cu:Sn = 3:1 | 20 | 362 | 306 | 55 | 84.7 | 582 | 99.2 | 577 |
| Comp. 9 | Cu:Sn = 3:1 | 70 | 487 | 337 | 150 | 69.2 | 933 | 22.0 | 205 |

INDUSTRIAL APPLICABILITY

As is clear from the above Tables 1 to 6, the present invention provides an electrode material for a non-aqueous solvent secondary cell having a high discharge capacity (dedoping capacity) per volume as a whole and an improved cycle characteristic by combining a metal (intermetallic compound) electrode material which has a high charging capacity (doping capacity) per volume but also has drawbacks of a large irreversible capacity and a poor cycle characteristic, with a capacitive carbon material which per se has capacities of doping and dedoping Li, optionally together with a fine electroconductive additive, to remarkably improve the above-mentioned drawbacks of the metal electrode material. The present invention also provides an electrode and a secondary cell containing the electrode material.

The invention claimed is:

1. An electrode material for a non-aqueous solvent secondary cell, comprising a non-heated powdery mixture of a metal material capable of doping and dedoping lithium, granular graphite characterized by an average layer spacing ($d_{002}$) of at most 0.345 nm as measured by X-ray diffraction method and a specific surface area below 1 m$^2$/g as measured by BET method according to nitrogen adsorption and a fine electroconductive additive; and containing the metal material at 5–60 wt. %, the granular graphite at 40 - 95 wt. % (giving a total of 100 wt. % together with the metal material), and the fine electroconductive additive at 1–10 wt. % (based on the total of the metal material and the granular graphite), wherein the fine electroconductive additive is an electroconductive carbon black selected from the group consisting of acetylene black and furnace black.

2. An electrode material according to claim 1, wherein the metal material is an intermetallic compound of at least one species of metal selected from Cu, Mg, Mo, Fe and Ni with Sn.

3. An electrode for a non-aqueous solvent secondary cell, obtained by forming an electrode material according to claim 2 together with a binder.

4. A non-aqueous solvent secondary cell including the electrode of claim 3 as either one of a positive electrode and a negative electrode.

5. A non-aqueous solvent secondary cell including the electrode of claim 3 as a negative electrode.

6. An electrode for a non-aqueous solvent secondary cell, obtained by forming an electrode material according to claim 1 together with a binder.

7. A non-aqueous solvent secondary cell including the electrode of claim 6 as either one of a positive electrode and a negative electrode.

8. A non-aqueous solvent secondary cell including the electrode of claim 6 as a negative electrode.

9. An electrode material for a non-aqueous solvent secondary cell, comprising a non-heated powdery mixture of a metal material capable of doping and dedoping lithium, granular graphite characterized by an average layer spacing ($d_{002}$) of at most 0.345 nm as measured by X-ray diffraction method and a specific surface area below 1 m$^2$/g as measured by BET method according to nitrogen adsorption and a fine electroconductive additive; and containing the metal material at 5–60 wt. %. the granular graphite at 40–95 wt. % (giving a total of 100 wt. % together with the metal material), and the fine electroconductive additive at 1–10 wt. % (based on the total of the metal material and the granular graphite), wherein the metal material is an intermetallic compound of Cu and Sn.

10. An electrode for a non-aqueous solvent secondary cell, obtained by forming an electrode material according to claim 9 together with a binder.

11. A non-aqueous solvent secondary cell including the electrode of claim 10 as either one of a positive electrode and a negative electrode.

12. A non-aqueous solvent secondary cell including the electrode of claim 10 as a negative electrode.

* * * * *